United States Patent
Grosman et al.

(10) Patent No.: US 9,904,682 B2
(45) Date of Patent: *Feb. 27, 2018

(54) CONTENT-AWARE FILTER OPTIONS FOR MEDIA OBJECT COLLECTIONS

(71) Applicant: upthere, inc., Redwood City, CA (US)

(72) Inventors: Yefim Grosman, Sunnyvale, CA (US); Bertrand Serlet, Palo Alto, CA (US); Douglas Richardson, Sunnyvale, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/364,919

(22) Filed: Nov. 30, 2016

(65) Prior Publication Data

US 2017/0083529 A1    Mar. 23, 2017

Related U.S. Application Data

(63) Continuation of application No. 14/078,738, filed on Nov. 13, 2013, now Pat. No. 9,779,098.

(51) Int. Cl.
G06F 7/00     (2006.01)
G06F 17/30    (2006.01)
G06F 13/14    (2006.01)

(52) U.S. Cl.
CPC .. G06F 17/30058 (2013.01); G06F 17/30041 (2013.01); G06F 17/30044 (2013.01); G06F 17/30867 (2013.01)

(58) Field of Classification Search
CPC ......... G06F 17/30058; G06F 17/30867; G06F 17/30994; G06F 17/30041; G06F 17/30044

(Continued)

(56) References Cited

U.S. PATENT DOCUMENTS 6,931,416 B2 *   8/2005   Kelley ............. G06F 17/30873
8,316,027 B2    11/2012   Pavlik
(Continued)

FOREIGN PATENT DOCUMENTS

WO    WO 2011/148054    12/2011

OTHER PUBLICATIONS

K. McGuinness et al., "The AXES PRO Video Search System" ICRM, Apr. 16-20, 2013, 2 pages.
A. Kleinen, "Mobile Facets—Faceted Search and Exploration of Open Social Media Data on a Touchscreen Mobile Phone" Iterative Prototype Design and Evaluation, Jul. 2011, 31 pages.
Grosman, U.S. Appl. No. 14/078,738, filed Nov. 13, 2013, Final Office Action, dated Mar. 15, 2017.
Amazon Screen Shot. Www.amazon.com, Cell phone Camera Lens, last viewed on Aug. 28, 2017, 1 page.

(Continued)

*Primary Examiner* — Heather Herndon
*Assistant Examiner* — Cecile Vo
(74) *Attorney, Agent, or Firm* — Chang & Hale LLP

(57) ABSTRACT

A method and apparatus are provided for navigating through a media object collection using a mobile device. Users navigate to the target media objects by repeatedly specifying filters. After a user specifies a filter, the filter is applied in combination with all previously specified filters to produce a filtered set of media objects. After a filter is applied, a display level is selected for each hierarchical dimension for which the media objects have metadata. The selection of the display level may be based on the number of distinct values that the media objects in the filtered set have for each level of the hierarchical dimension. Single-action controls are then displayed for each of the values that the media objects in the filtered set have for the selected display level.

18 Claims, 9 Drawing Sheets

(58) Field of Classification Search
USPC .......................................................... 707/722
See application file for complete search history.

(56) References Cited

U.S. PATENT DOCUMENTS

| | | | |
|---|---|---|---|
| 2010/0121569 A1* | 5/2010 | Nakamura | G01C 21/30 |
| | | | 701/532 |
| 2010/0121869 A1 | 5/2010 | Biannic | |
| 2011/0078584 A1 | 3/2011 | Winterstein et al. | |
| 2011/0173214 A1 | 7/2011 | Karim | |
| 2012/0053986 A1* | 3/2012 | Cardno | G06F 17/30572 |
| | | | 705/7.29 |
| 2012/0311441 A1 | 12/2012 | Reyna | |
| 2015/0134638 A1* | 5/2015 | Grosman | G06F 17/30041 |
| | | | 707/722 |

OTHER PUBLICATIONS

Amazon Screen Shot, www.amazon.com, Sony Alpha a6000 Mirrorless Digital Camera with 16-50mm Power Zo0m Lens, last viewed on Aug. 28, 2017, 1 page.

U.S. Appl. No. 14/078,738, filed Nov. 13, 2013, Office Action, dated Aug. 12, 2016.

U.S. Appl. No. 14/078,738, filed Nov. 13, 2013, Office Action, dated Dec. 4, 2015.

U.S. Appl. No. 14/078,738, filed Nov. 13, 2013, Interview Summary, dated Nov. 14, 2016.

U.S. Appl. No. 14/078,738, filed Nov. 13, 2013, Final Office Action, dated May 2, 2016.

Grosman, U.S. Appl. No. 14/078,738, filed Nov. 13, 2013, Notice of Allowance, dated May 31, 2017.

* cited by examiner

US 9,904,682 B2

CONTENT-AWARE FILTER OPTIONS FOR MEDIA OBJECT COLLECTIONS

CROSS-REFERENCE TO RELATED APPLICATIONS; BENEFIT CLAIM

This application is a Continuation of prior U.S. patent application Ser. No. 14/078,738 entitled "Navigating Through Media Object Collection", filed Nov. 13, 2013, the contents of which are incorporated by reference for all purposes as if fully set forth herein.

FIELD OF THE INVENTION

The present invention relates to techniques for navigation through collections of media objects and, more specifically, to navigating through collections of media objects using single-action controls that correspond to dynamically-generated options based on metadata extracted, learned or specified by the user, and attached to the media objects.

BACKGROUND

Many mobile devices are capable of creating and displaying media objects. For example, digital cameras, smartphones, tablets and PDAs are frequently capable of taking photos, recording audio and/or capturing video, displaying photos and videos, and playing audio. It is common for the owners of such devices to create media objects at a faster rate than they delete the media objects they have created. Consequently, the size of personal media object collections seems to be ever increasing. For example, it is not uncommon for the owner of a smartphone to have a collection of thousands of photos and/or videos taken using the smartphone.

A personal collection of media objects may be stored entirely on the device used to create the media objects, or distributed among several locations. For example, one user may retain all photos and videos taken by a smartphone on the smartphone. On the hand, another user may periodically upload some photos to a photo application on a desktop computer, to various social networks, and/or to online services designed media object sharing.

Having created such large collections of media objects, users frequently want to share their media objects with others. While a mobile device owner may know exactly which media object she wants to share, the challenge is finding that particular media object with the user's collection. The task of finding the media object is even more difficult when the device through which the navigation is to be performed is a mobile device with a relatively small display.

Unfortunately, the larger the collection of media objects, the more difficult it is to use a mobile device to show specific media objects to others. For example, when thousands of photos are involved, scrolling through the photos to find the one you want to show a friend is time-consuming and cumbersome. Displaying a large number of photos at a time may speed up the scrolling process, but is not a feasible solution either, because the relatively small display of mobile devices limits how many photos can be concurrently displayed while still being recognizable. Displaying hundreds of photos at once would result in photos so small that the user would not be able to easily identify the particular photo the user desires to show the friend.

As an alternative to scrolling, some photo management systems allow users to find photos by (a) text searching based on metadata tags, (b) specifying metadata filters, and/or (c) performing image similarity searches. Unfortunately, when a mobile device is involved, these alternatives may also be cumbersome. For example, entering text for a text search is often cumbersome on a mobile device. In the case of metadata filters, simply showing all of the filters that are available may be too much to fit well on the limited display screen of a mobile device. An image similarity search, on the other hand, is only useful once a user has identified a photo of interest. It does not address the problem of finding that photo in the first place.

Thus, there is a need for a mechanism that allows users to efficiently navigate, using the relatively small display of a mobile device, to specific media objects they would like to show and/or play to others using the mobile device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are provided that allow mobile device users to quickly and efficiently navigate through large collections of media objects to locate the media objects that they want to share. For the purpose of explanation, the media objects that a user wants to view and/or play are referred to herein as the "target media objects".

In one embodiment, users navigate to the target media objects by repeatedly specifying filters. After a user specifies a filter, the filter is applied in combination with all previously specified filters to produce a filtered set of media objects.

In one embodiment, if the number of media objects in the filtered set of media objects is below a certain threshold after applying a filter, then the media objects in the filtered set are displayed without displaying further filter options. On the other hand, if the number of media objects in the filtered set of media objects is not below the certain threshold after applying the filter, then no media objects are displayed. Instead, an additional set of filter options are displayed, and the process is repeated until the number of media objects in the filtered set is below the certain threshold or the user specifically chooses to exit the search/navigation mode and display the remaining media objects.

In an alternative embodiment, thumbnails of the media objects that currently satisfy all specified filter criteria are displayed below the filter option controls. When the number of media objects that currently satisfy the filter criteria is large, only a small subset of the media objects may fit on the display. When that is the case, the user is able to scroll down to view more media objects, in one embodiment.

Unlike other filter-based media object search systems, the techniques described herein do not present the user with an interface for specifying all possible filters at once. Rather, after each new filter is applied, the filter options that are presented to the user are based on the metadata associated with the media objects that remain in the filtered set. For example, in one embodiment, filter options that would leave no media objects in the filtered set are never presented. Further, the filter options are selected in such a way as to avoid presenting too many filter options at once.

Filter-Based Navigation

Figure 1:
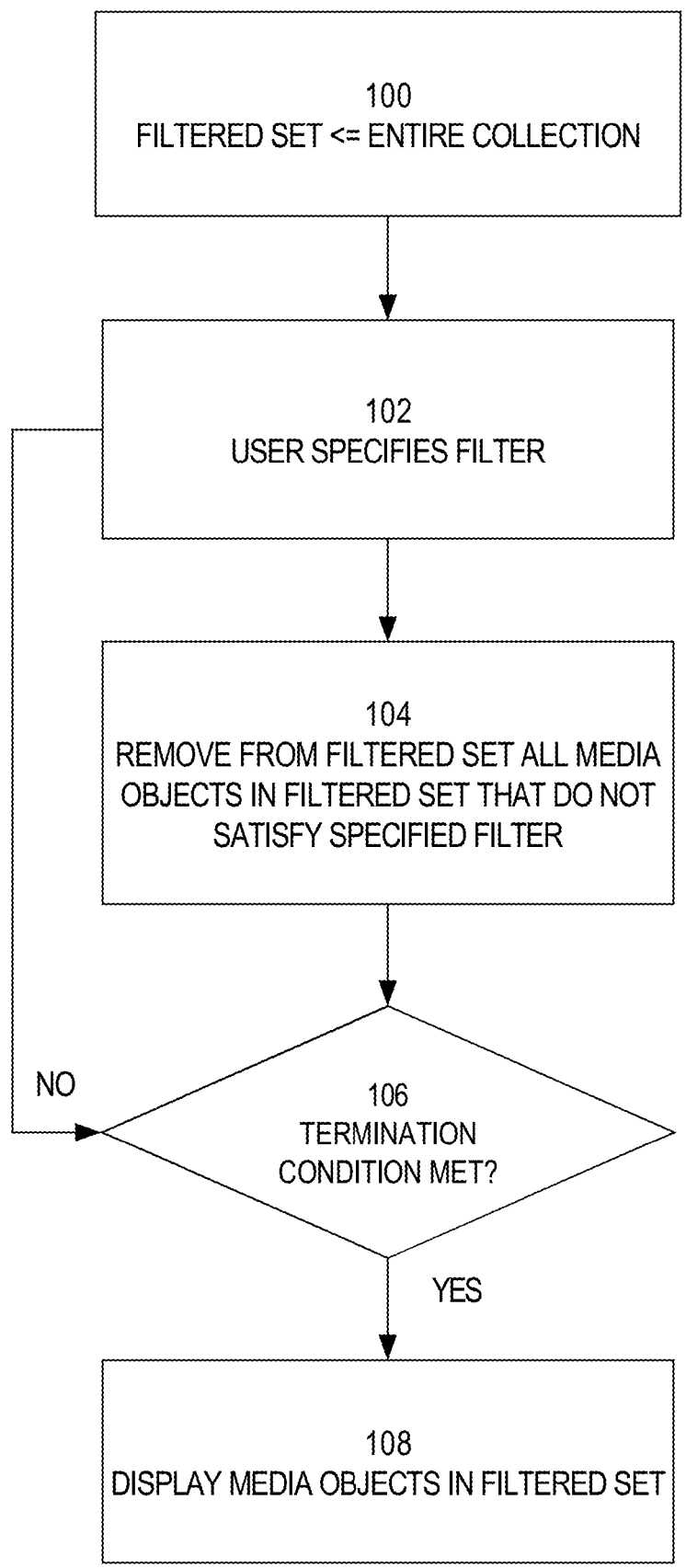
FIG. 1 is a flowchart that illustrates the general steps of filter-based navigation.

According to one embodiment, a media object navigation tool is provided that allows users navigate to target media objects using filter-based navigation. Referring to FIG. 1, it is a flowchart that shows the general steps involved of filter-based navigation.

Specifically, to begin the navigation process, the "filtered set" is established to be the entire collection of media objects (step 100). The entire collection may include media objects stored at many different sources, including locally-stored media objects, media objects stored at online services, etc. After the entire collection is initially established as the filtered set, the filtered set of objects is repeatedly filtered until some termination condition is satisfied. Specifically, at step 102, the user specifies a filter, at step 104 media objects that do not satisfy the filter are removed from the filtered set, and at step 106 the process repeats (returning to step 102) if the termination condition is not met.

When the termination condition is met at step 106, control passes to step 108 and the media objects that remain in the filtered set (which satisfy all criteria specified by the user), are displayed to the user.

Various terminating conditions may be used in conjunction with filter-based navigation. For example, the media object navigation tool may provide, in addition to the filter options, a "show" control. In such an embodiment, the termination condition may be user selection of the "show" control. In response to selection of the "show" control, the media object navigation tool may show all media objects currently in the filtered set.

As another example, the termination condition may be that the number of media objects in the filtered set is below a predetermined threshold. The threshold may be based on the display size of the mobile device running the media object navigation tool. For example, the threshold may be "4" for a mobile phone, while the threshold may be "10" for a tablet.

Whether filter-based navigation is efficient or cumbersome hinges on which filter options are presented during each iteration. Presenting too many options at any given iteration becomes cumbersome for users of mobile devices, due to the relatively small displays on which the options need to be presented. On the other hand, presenting too few options may also cause problems, including the need for an excessive amount of iterations before filtering the collection down to the target media objects.

Various techniques are described hereafter for automatically selecting which filter options to display at each iteration in a manner that results in the display of relatively few filter options in any given iteration, while still being able to arrive at target media objects in relatively few iterations.

Single-Action Filter Controls

As mentioned above, the techniques described herein involve iteratively applying filters to a collection of media objects until the collection is filtered down to the target media objects. According to one embodiment, during each iteration, the media object navigation tool enables the user to select a filter option (step 102 of FIG. 1) by presenting the user with a set of single-action controls, each of which corresponds to a filter option. Upon selection of a single-action control, the filter option associated with the single-action control is applied to the filtered set of media objects. The process of presenting single-action controls, receiving input that selects one of the single-action controls, and filtering the filtered set of media objects based on the filter option that corresponds to the control that was selected, may be repeated until the collection has been filtered down to the target media objects.

A single-action filter control is a control that is selected in a single action. For example, if the mobile device that is executing the media object navigation tool has a touch-sensitive screen, the single action may simply be a "tap" or "swipe" on the screen region that displays a single-action control. For mobile devices that have keyboards or physical buttons, the single action may be pressing a key or button that is associated with the single-action control.

In embodiments that use single-action controls for selecting filter options, each input action initiates an additional round of filtering. Thus, in an embodiment where the actions are "taps", one filter option may be applied in one tap, two filter options may be applied in two taps, etc. Using the techniques described hereafter to dynamically select which filter options are available at each iteration, users may navigate to target media objects in just a few taps, even when the target media objects belong to a large collection.

Dynamically Determining which Filter Options to Present

As explained above, at each iteration, the media object navigation tool presents the user with a set of single-action controls, each of which corresponds to a filter option. Consequently, the greater the number of filter options presented to a user during any given iteration, the greater the number of controls that are concurrently displayed to the user. Displaying a large number of controls at the same time can be problematic when the device that is displaying the controls is a mobile device with limited display space. Therefore, it is preferable to limit the number of filter options presented at each iteration, yet still present those filter options that allow the user to navigate to target media objects in as few iterations as possible.

According to one embodiment, to reduce both (a) the number of filter options presented in any given iteration, and (b) the number of iterations needed to navigate to target media objects, the filter options that are provided at any given iteration are selected based on the metadata values of the media objects that belong to the filtered set during that iteration. At the end of each iteration, a newly selected filter is applied to the filtered set, thereby reducing the membership of the filtered set.

The distribution of the metadata values associated with the media objects that belong to the filtered set before a filter is applied may be quite different than the distribution of the metadata values associated with media objects that belong to the filtered set after the filter is applied. For example, before a filter "location=France" is applied, half of the media objects in the filtered set may have the creation date of 2010, and half the media objects in the filtered set may have the creation date of 2011. However, after applying the filter "location=France", the filtered set may only have media objects with the creation date of 2011 (the year of the trip to France).

Because the membership of the filtered set changes when a filter is applied, so does the distribution of metadata values possessed by the members of the filtered set. Because the distribution of metadata values possessed by the member of the filtered set changes, and the filter options that are presented are selected based on the distribution of those metadata values, the presented filter options change from iteration to iteration.

For example, during the iteration where half of the media objects in the filtered set have a creation date of 2010, and half of the media objects in the filtered set have a creation date of 2011, the presented filter options may include "creation year=2010" and "creation year=2011". However, once "location=France" is selected, all media objects that remain in the filtered set have a creation date of 2011. Therefore, during the next iteration, the presented filter options may not include "creation year=2010" (because no media object in the filtered set would satisfy this filter), nor "creation year=2011" (because all media objects in the filtered set satisfy this filter). Instead, the filter options may include "creation month=JAN" and "creation month=FEB", if the filtered set includes media objects created in France during the months of January and February of 2011.

In this example, the first iteration of displays filter options relating to the "year" level of the time hierarchy, while the second iteration displays filter options relating to the "month" level of the time hierarchy. As shall be described in greater detail hereafter, selecting which filter options to present at each iteration involves deciding which the level, in a hierarchical dimension, is the "display level" for which to present filter options.

Media Object Metadata

There is virtually no limit to the types of metadata that may be stored in conjunction with media objects. For example, photos, video recordings and audio recordings may have metadata that indicates:
 when the media object was created
 where the media object was created
 the device used to create the media object
 the settings of the device at the time the device was used to create the media object
 the owner of the device used to create the media object
 user-specified tags
 automatically-generated tags Some of the metadata may be automatically generated at the time the media object is created. For example, at the time a photo is taken, the following pieces of metadata may be automatically generated for the photo:
 the time/date indicated on a clock maintained by the device used to take the photo
 the location of the device when the photo was taken, as indicated by a GPS or other location-determining mechanism on the device
 information about the device used to take the photo
 information about the settings of the device when the photo was taken
 information about the dimensions of the photo Other metadata may be manually added by users, or automatically generated after the photo is taken. Examples of metadata that may be automatically generated after the photo is taken include:
 whether the photo includes a face (after performing an automated face recognition analysis on the photo)
 the identity of a person's whose face is in the photo (after performing an automated face recognition analysis on the photo)
 the name of a famous landmark in the photo (after performing an automated match analysis between the photo and images of famous landmarks)

These are merely examples of the type of metadata that may be associated with media objects, either automatically or manually, either at the time of the media objects are created, or at a later time. The techniques described herein are not limited to any particular type of metadata, nor to any particular manner of associating the metadata with the media objects.

For the purpose of explanation, it shall be assumed that the metadata associated with media objects includes at least (a) the time at which the media object was created, and (b) the place at which the media object was created. Frequently, devices that create media objects automatically store both of these pieces of metadata with the media objects at the time the media objects are created. However, these pieces of metadata may also be assigned to media objects, either manually or automatically, after the media objects are created.

Index Usage to Facilitate Navigation

As shall be described in greater detail below, the metadata associated with media objects is used as the basis for navigating through a collection to locate target media objects. According to one embodiment, neither the metadata set nor the media object set are searched directly. Rather, indexes are built on the metadata associated with the media objects, and filters are applied by using the data in the index. By using the data in the indexes to apply filters, multiple filters may be run very efficiently. Further, filtering in this manner may be performed without storing any metadata or objects on the mobile device itself. The entire navigation process may be performed without having any media objects or metadata of the media objects stored locally on the mobile device being used to perform the navigation operations. Avoiding the need to locally store the media objects or the metadata associated therewith is useful in that some mobile device may not have the storage necessary to efficiently store the media objects or the metadata thereof.

Hierarchical Dimensions

Hierarchical dimensions are dimensions that can be expressed at multiple levels of granularity. For example, "time" is a hierarchical dimension because time can be expressed at multiple levels of granularity, including but not limited to:
  year
  month
  day
  hour
  minute As another example, "location" is a hierarchical dimension because location can be expressed at multiple levels of granularity, including but not limited to:
  continent
  country
  state
  city
  GPS coordinates Filter Options Based on Hierarchical Dimensions According to one embodiment, the filter options that are presented to a user are selected dynamically at each iteration based, at least in part, on how many distinct values the media objects in the filtered set have for each level of a hierarchical dimension. In such embodiments, dynamically selecting filter options to present may be performed in multiple phases, as illustrated in FIG. 2.

Figure 2:
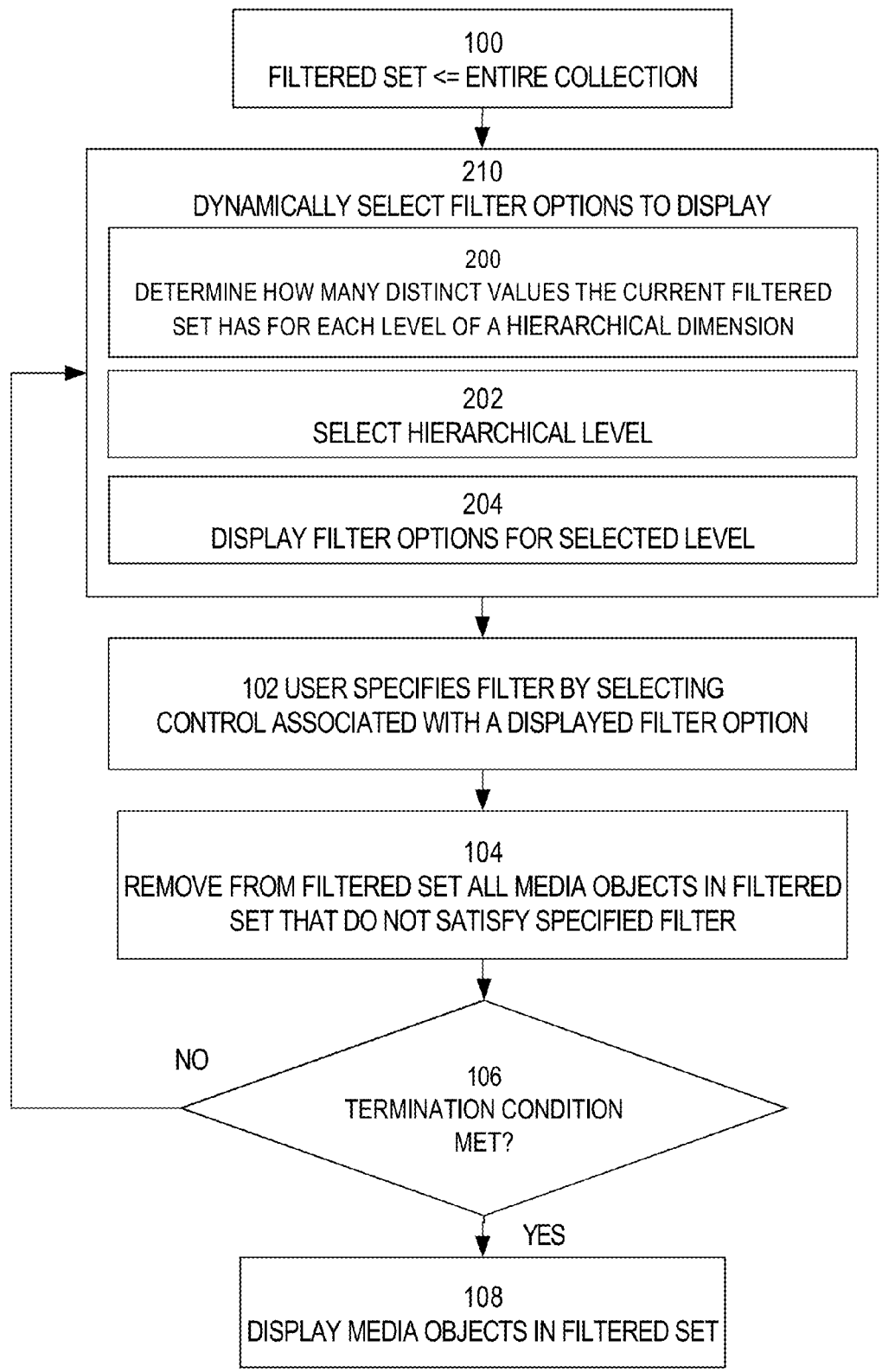
FIG. 2 is a flowchart that illustrates steps for dynamically selecting filters during filter-based navigation, according to one embodiment.

Referring to FIG. 2, it illustrates that a step of dynamically selecting filter options (step 210) may involve determining how many distinct values the current filtered set has for each level of a hierarchical dimension (step 200). After determining how many distinct values the current filtered set has for each level of the hierarchical dimension, the media object navigation tool selects a hierarchical level (step 202) to be the "display level" based, at least in part, on how many how many distinct values the current filtered set has for each level of the hierarchical dimension. Once a hierarchical level is selected as the display level, the media object navigation tool displays filter options for each distinct value, in the current filtered set, for the selected display level (step 204).

Once the filter options for the selected display level have been displayed, a user may select one of the filter options (step 102) by selecting the single-action control associated with the filter option, as described above. Selection of the filter option causes the corresponding filter to be applied to the filter set (step 104), and the process repeats until the termination condition is met.

For the purpose of illustration, assume that a user's photo collection includes:
  10 photos taken in Jan. 1, 2010
  15 photos taken in Jan. 2, 2010
  4 photos taken Feb. 5, 2010
  30 photos taken Dec. 24, 2010, and
  30 photos taken Jan. 1, 2011

In this example, during the first iteration of step 210, the media object navigation tool determines (step 200) that the collection has:
  two distinct values (2010, 2011) for the "year" level of the time dimension.
  four distinct values (Jan/2010, Feb/2010, Dec/2010, Jan/2011) for the "month" level of the time dimension
  five distinct values (Jan/1/2010, Jan/2/2010, Feb/5/2010, Dec/24/2010, Jan/1/2011) for the "day" level of the time dimension At step 202, the media object navigation tool selects a level in the time hierarchy based on how many distinct values the current filtered set has for each level of the hierarchical dimension. The rule used by the media object navigation tool to select the level may vary from implementation to implementation, and the techniques described herein are not limited to any particular rule for selecting a hierarchical level to be the display level. However, for the purpose of illustration, it shall be assumed that the rule is to select, as the display level, the coarsest level that has more than one distinct value in the filtered set.

Applying this rule, at step 202 the "year" level of the time hierarchy is selected because "year" is the coarsest level of the time hierarchy that has more than one distinct value in the filtered set. In the present case, the "year" level has two distinct values (2010 and 2011). Once the "year" level in the time hierarchy has been selected, in step 204 the media object navigation tool displays filter options for the selected display level. In one embodiment, one filter option is displayed for each distinct value. Thus, the user may be presented with one control that corresponds to the filter "year=2010" and another control that corresponds to the filter "year=2011".

Continuing with the example, assume that at step 102 the user selects the control associated with the filter "year=2010". In response to selection of the control associated with the "year=2010" filter, the 30 photos taken in 2011 would be filtered out of the filtered set (step 104). After the filter has been applied, a determination is made (step 106) whether the termination condition is met.

For the purpose of illustration, it shall be assumed that the termination condition is that the filtered set contains less than five photos. Since more than five photos remain in the filtered set after applying the "year=2010" filter, control passes back to step 102 for the next iteration.

At the start of the second iteration, the filtered set includes:
  10 photos taken in Jan. 1, 2010
  15 photos taken in Jan. 2, 2010
  4 photos taken Feb. 5, 2010
  30 photos taken Dec. 24, 2010

Thus, during the second iteration of step 102, the media object navigation tool determines (step 200) that the collection has:
  one distinct value (2010) for the "year" level of the time dimension.
  three distinct values (Jan/2010, Feb/2010, Dec/2010) for the "month" level of the time dimension
  four distinct values (Jan/1/2010, Jan/2/2010, Feb/5/2010, Dec/24/2010) for the "day" level of the time dimension At step 202, the media object navigation tool selects the "month" level of the time dimension, because "month" is the coarsest level that has more than one distinct value in the filtered set. In the present case, the "month" level has three distinct values (Jan/2010, Feb/2010, Dec/2010).

Once the "month" level in the time hierarchy has been selected, in step 204 the media object navigation tool displays filter options for the selected display level. In one embodiment, one filter option is displayed for each distinct value. Thus, the user may be presented with three controls that respectively correspond to the filters "month=Jan/2010", "month=Feb/2010" and "month=Dec/2010".

Continuing with the example, assume that at step 102 the user selects the control associated with the filter "month=Feb/2010". In response to selection of the control associated with the "month=Feb/2010" filter, all but the 4 photos taken in February of 2010 would be filtered out of the filtered set (step 104). After the filter has been applied, a determination is made (step 106) whether the termination condition is met.

In the present example, the termination condition is that the filtered set contains less than five photos. After the "month=Feb/2010" filter is applied, the filtered set contains 4 photos, and therefore satisfies the termination condition. Consequently, at control would pass from step 106 to step 108, and the four photos from February 2010 would be displayed to the user.

Media Objects with Multiple Hierarchical Dimensions

In the example given above, filter options were presented for only one hierarchical dimension: time. However, media objects may have metadata for multiple hierarchical dimensions. For example, media objects may have metadata for both when the media objects were created (time) and where the media objects where created (location).

According to one embodiment, when media objects have metadata for multiple hierarchical dimensions, the filter options that are presented during any given iteration may include filter options for each of the hierarchical dimensions for which the media objects have metadata.

For example, assume that:
the 10 photos taken in Jan. 1, 2010 were taken in San Jose, Calif.
the 15 photos taken in Jan. 2, 2010 were taken in Fresno, Calif.
the 4 photos taken Feb. 5, 2010 were taken in New York, N.Y.
the 30 photos taken Dec. 24, 2010 include 5 taken in New York, N.Y., and 25 taken in Honolulu, Hi.
the 30 photos taken Jan. 1, 2011 were taken in Paris, France In this example, during the first iteration of step 210, the media object navigation tool determines (step 200) that the collection has:
two distinct values (2010, 2011) for the "year" level of the time dimension.
four distinct values (Jan/2010, Feb/2010, Dec/2010, Jan/2011) for the "month" level of the time dimension
five distinct values (Jan/1/2010, Jan/2/2010, Feb/5/2010, Dec/24/2010, Jan/1/2011) for the "day" level of the time dimension
two distinct values (North America, Europe) for the "continent" level of the location dimension
two distinct values (U.S. and France) for the "country" level of the location dimension
five distinct values (San Jose, Fresno, New York, Paris, Honolulu) for the "city" level of the location dimension At step 202, the media object navigation tool selects a level for each hierarchical dimension (e.g. "time" and "location") based on how many distinct values the current filtered set has for each level of each of the hierarchical dimensions. Assuming that the rule is to select the coarsest level that has more than one distinct value in the filtered set, at step 202 the "year" level of the time hierarchy is selected, and the "continent" level in the location hierarchy is selected.

In the present case, the "year" level has two distinct values (2010 and 2011), and the "continent" level has two distinct values (North America and Europe). Once the "year" level and the "continent" level have been selected, in step 204 the media object navigation tool displays filter options for the selected display levels. In an embodiment where one filter option is displayed for each distinct value, the user may be presented with four controls, one for each of the filters: "year=2010", "year=2011", "continent=North America", "continent=Europe".

Continuing with the example, assume that at step 102 the user selects the control associated with the filter "year=2010". In response to selection of the control associated with the "year=2010" filter, the 30 photos taken in 2011 would be filtered out of the filtered set (step 104). After the filter has been applied, a determination is made (step 106) whether the termination condition is met.

For the purpose of illustration, it shall be assumed that the termination condition is that the filtered set contains less than five photos. Since more than five photos remain in the filtered set after applying the "year=2010" filter, control passes back to step 102 for the next iteration.

At the start of the second iteration, the filtered set includes:
the 10 photos taken in Jan. 1, 2010 in San Jose, Calif.
the 15 photos taken in Jan. 2, 2010 in Fresno, Calif.
the 4 photos taken Feb. 5, 2010 in New York, N.Y.
the 5 photos taken Dec. 24, 2010 in New York, N.Y.,
the 25 photos taken Dec. 24, 2010 in taken in Honolulu, Hi.

Thus, during the second iteration of step 210, the media object navigation tool determines (step 200) that the collection has:
one distinct value (2010) for the "year" level of the time dimension.
three distinct values (Jan/2010, Feb/2010, Dec/2010) for the "month" level of the time dimension
four distinct values (Jan/1/2010, Jan/2/2010, Feb/5/2010, Dec/24/2010) for the "day" level of the time dimension
one distinct value (North America) for the "continent" level of the location dimension
one distinct value (U.S.) for the "country" level of the location dimension
four distinct values (San Jose, Fresno, New York, Honolulu) for the "city" level of the location dimension At step 202, the media object navigation tool selects the "month" level of the time dimension, because "month" is the coarsest level that has more than one distinct value in the filtered set. In the present case, the "month" level has three distinct values (Jan/2010, Feb/2010, Dec/2010). In addition, the media object navigation tool selects the "city" level of the location dimension, because "city" is the coarsest level that has more than one distinct value in the filtered set. In the present case, the "city" level has four distinct values (San Jose, Fresno, New York, Honolulu).

Once the "month" and "city" levels have been selected, in step 204 the media object navigation tool displays filter options for the selected display levels. In one embodiment, one filter option is displayed for each distinct value. Thus, the user may be presented with five controls that respectively correspond to the filters "month=Jan/2010", "month=Feb/2010" and "month=Dec/2010", "city=San Jose", "city=Fresno", "city=New York", "city=Honolulu".

Continuing with the example, assume that at step 102 the user selects the control associated with the filter "city=New York". In response to selection of the control associated with the "city=New York" filter, all photos not taken in New York in 2010 would be filtered out of the filter set (step 104). Thus, the only photos remaining in the filtered set would be:
the 4 photos taken Feb. 5, 2010 in New York, N.Y.
the 5 photos taken Dec. 24, 2010 in New York, N.Y., After the filter has been applied, a determination is made (step 106) whether the termination condition is met. In the present example, the termination condition is that the filtered set contains less than five photos. After the "city=New York" filter is applied, the filtered set contains 9 photos, and therefore does not satisfy the termination condition. Since more than five photos remain in the filtered set, control passes back to step 102 for the next iteration.

At the start of the third iteration, the filtered set includes:
the 4 photos taken Feb. 5, 2010 in New York, N.Y.
the 5 photos taken Dec. 24, 2010 in New York, N.Y.,
Thus, during the third iteration of step 210, the media object navigation tool determines (step 200) that the collection has:
one distinct value (2010) for the "year" level of the time dimension.
two distinct values (Feb/2010, Dec/2010) for the "month" level of the time dimension
two distinct values (Feb/5/2010, Dec/24/2010) for the "day" level of the time dimension
one distinct value (North America) for the "continent" level of the location dimension
one distinct value (U.S.) for the "country" level of the location dimension
one distinct value (New York) for the "city" level of the location dimension At step 202, the media object navigation tool selects the "month" level of the time dimension, because "month" is the coarsest level that has more than one distinct value in the filtered set. In the present case, the "month" level has two distinct values (Feb/2010, Dec/2010). During this iteration, the media object navigation tool selects no level of the location dimension, because every level has only one distinct value in the filtered set.

Once the "month" level has been selected, in step 204 the media object navigation tool displays filter options for the selected display level. In one embodiment, one filter option is displayed for each distinct value. Thus, the user may be presented with two controls that respectively correspond to the filters "month=Feb/2010" and "month=Dec/2010".

Continuing with the example, assume that at step 102 the user selects the control associated with the filter "month=Feb/2010". In response to selection of the control associated with the "month=Feb/2010" filter, all photos not taken in February of 2010 would be filtered out of the filter set (step 104). Thus, the only photos remaining in the filtered set would be:
the 4 photos taken Feb. 5, 2010 in New York, N.Y.

After the filter has been applied, a determination is made (step 106) whether the termination condition is met. In the present example, the termination condition is that the filtered set contains less than five photos. After the "month=Feb/2010" filter is applied, the filtered set contains 4 photos, consequently control would pass from step 106 to step 108, and the four photos taken in New York in February 2010 would be displayed to the user.

Selecting Levels for Each of Multiple Hierarchical Dimensions

Figure 3:
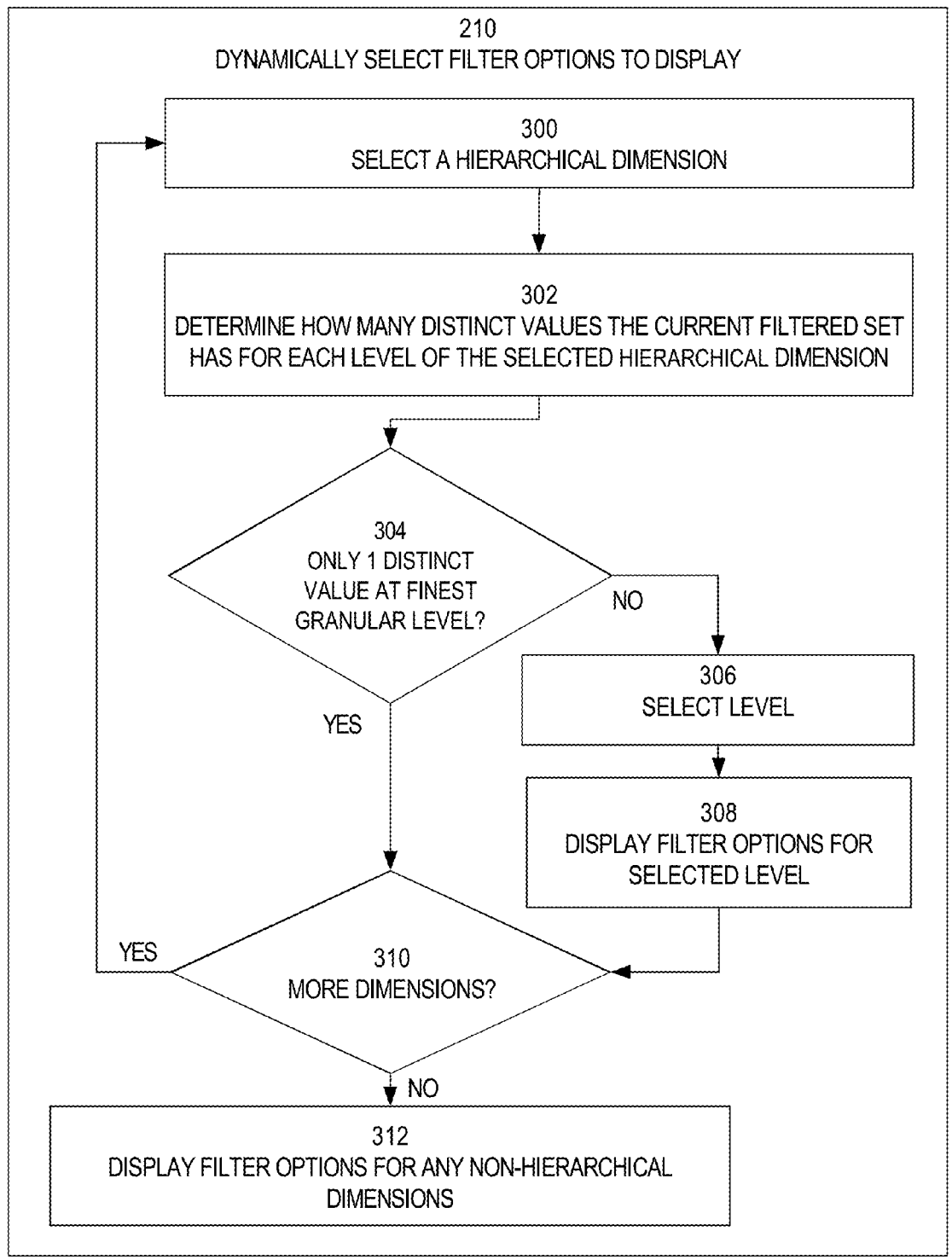
FIG. 3 is a flowchart that illustrates how to dynamically select filter options based on particular selection criteria, according to an embodiment.

In the scenario given above, during each iteration, a level was selected as the display level for each of multiple hierarchical dimensions. FIG. 3 is a flow chart illustrating how step 210 may be implemented to support navigation using multiple hierarchical dimensions, according to one embodiment.

Referring to FIG. 3, steps 300 to 310 form a loop that is executed for each hierarchical dimension, to determine the display level of the hierarchical dimension. Further, if only one distinct value remains at the finest granular level, then no filter options are shown for the hierarchical dimension.

In step 300, the media object navigation tool selects a dimension. At step 302, the media object navigation tool determines how many distinct values the current filtered set has for each level of the selected hierarchical dimension.

At step 304, it is determined whether there is only one distinct value at the finest granularity level of the selected dimension. If there is only one distinct value at the finest granularity level of the selected dimension, then it is not possible to further filter the filtered set based on the selected hierarchical dimension. Therefore, rather than display any filter options for the selected dimension, no filter options are displayed for the selected dimension, and control passes to step 310.

If at step 304 there is more than one distinct value at the finest granular level of the selected dimension, then it is possible to further filter the filtered set based on the selected hierarchical dimension. Therefore, control passes to step 306 where a level is selected to be the display level, and then to step 308 where filter options are displayed for the selected display level. As mentioned above, various criteria may be used at step 306 to determine which level to select as the display level. For example, step 306 may involve selecting the coarsest level having more than one distinct value in the current filtered set. Alternatively, step 306 may involve selecting the finest level having more than one distinct value in the current filtered set and less than a threshold number of distinct values in the current filtered set. In such an embodiment, if the threshold is six, the dimension is location, and the current filtered set has two continents, four states, and twenty cities, then the "state" level of the location dimension would be selected at step 306.

After the filter options for the selected display level are displayed at step 308, control passes to step 310. At step 310, it is determined whether there are any dimensions that have not yet been processed. If so, control passes back to step 300. Otherwise, control passes to step 312 where displayed filter options are displayed for any non-hierarchical dimensions for which the media objects in the current filtered set have multiple distinct values.

Example Media Object Navigation Tool Interface

Referring to FIGS. 4A-4E, they are block diagrams of a navigation interface 400 generated by a media object navigation tool, according to one embodiment. The embodiment illustrated in FIGS. 4A-4E differs from the embodiments previously described in that thumbnails of the images of the filtered set are displayed initially, and after each filtering operation, rather than only after a termination condition is satisfied.

Figure 4A:
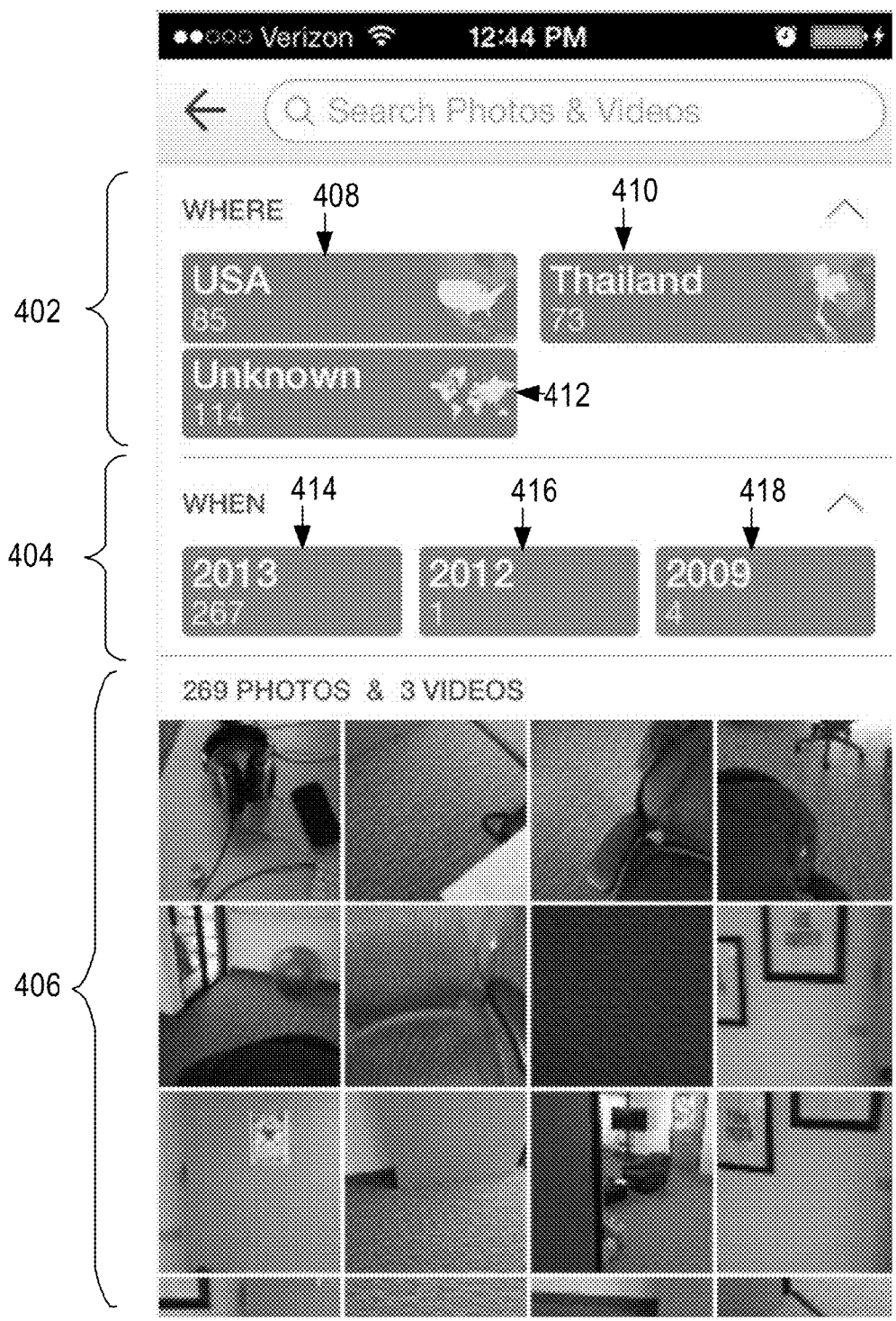
FIGS. 4A to 4E are block diagrams of the interface that a media object navigation tool may display on a mobile device while a user navigates through a collection of media objects, according to an embodiment.

Referring to FIG. 4A, interface 400 includes a region 402 that displays a set of single-action filter controls for the location dimension, and a region 404 that displays a set of single-action filter controls for the time dimension. Interface 400 also includes a region 406 that displays thumbnails of the media objects that are in the current filtered set.

FIG. 4A illustrates interface 400 at the point where the user has not yet selected any filter option. Thus, the filtered set is the entire collection of 269 photos and 3 videos.

As with the embodiment described above, the filter options that are presented at any given time are based on the number of distinct values the current filtered set has for each level of each hierarchical dimension. In the situation illustrated in FIG. 4A, the "country" level of the location dimension was selected because the filtered set has three distinct values at the country level. The selection of the "country" level may have been based, for example, on a rule that selects the coarsest level that has more than 2 distinct values. If no level of the dimension has more than 2 distinct values, then the finest level in the hierarchical dimension is selected.

Because the country level of the location dimension has been selected, region 402 displays a separate single-action filter control for each of the distinct values at the "country" level. In the illustrated example, the country level has three distinct values "USA", "Thailand" and "Unknown". Consequently, region 402 has three single-action filter controls 408, 410 and 412 that respectively correspond to the filter options "country=USA", "country=Thailand" and "country=Unknown".

With respect to the time dimension, the "year" level of the time dimension was selected because the filtered set has three distinct values at the year level. The selection of the "year" level may have also been based, for example, on a rule that selects the coarsest level that has more than 2 distinct values. If no level of the dimension has more than 2 distinct values, then the finest level in the hierarchical dimension is selected.

While in this example, the same selection rule is used for both the location dimension and the time dimension, in alternative embodiments, different selection rules may be applied to each dimension.

Because the year level of the time dimension has been selected, region 404 displays a separate single-action filter control for each of the distinct values at the "year" level. In the illustrated example, the year level has three distinct values "2013", "2012" and "2009". Consequently, region 404 has three single-action filter controls 414, 416 and 418 that respectively correspond to the filter options "year=2013", "year=2012" and "year=2009".

In the embodiment illustrated in FIG. 4A, each single-action option control also includes an indication of how many media objects in the current filtered set have the metadata value associated with the control. For example, control 408 indicates that 85 media objects in the current filtered set have the metadata value "USA" for the "country" attribute. Similarly, control 418 indicates that the current filtered set has 4 media object that have the value "2009" for the "year" attribute.

As mentioned above, selection of one of single-action filter option controls causes the filtered set to be filtered based on the option associated with the selected control. Thus, selection of control 408 would cause all media objects that do not have "country=USA" to be filtered out of the filtered set.

First Filter Selection

For the purposes of explanation, it shall be assumed that a user selects filter option control 414, which corresponds to the filter option "year=2013". Selecting filter option control 414 causes the media object navigation tool to filter the filtered set down to the 267 media objects that satisfy the filter "year=2013". After filtering the filtered set, levels are once again selected, for each hierarchical dimension, based on the number of distinct values the current filtered set (now 267 media objects) has for each level of the hierarchical dimension.

In the present example, the "country" level is once again selected for the location dimension, while the "month" level is selected for the time dimension. Consequently, interface 400 transitions from the display shown in FIG. 4A to the display shown in FIG. 4B.

Figure 4B:
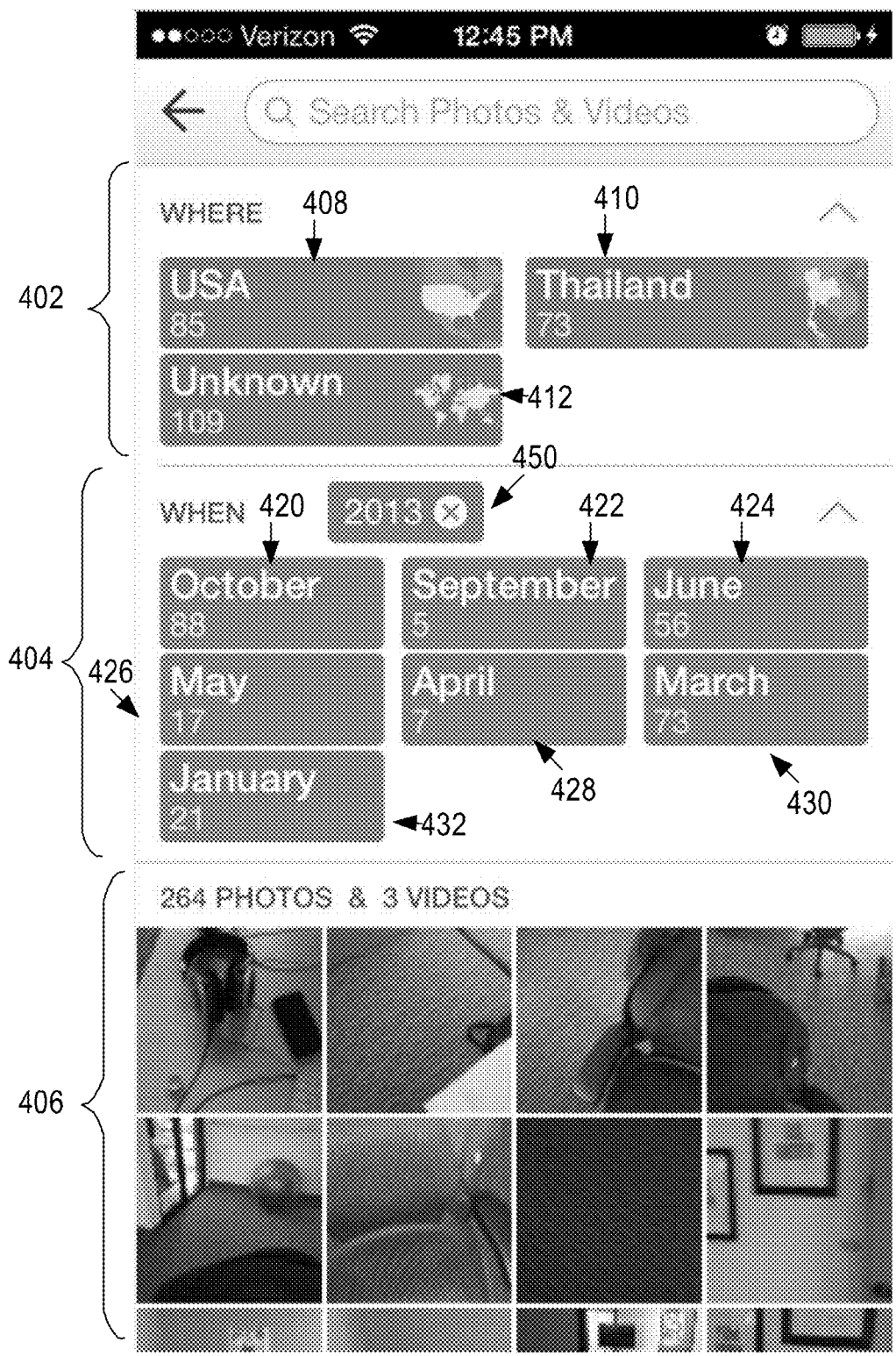

Referring to FIG. 4B, the contents of region 402 is unchanged, since the "country" level of the location dimension was selected again. In contrast, the contents of region 404 changed because the selected display level in the time dimension is now "month". Specifically, region 404 now displays single-action filter option controls 420, 422, 424, 426, 428, 430 and 432 that correspond, respectively, to the filter options "month=October", "month=September", "month=June", "month=May", "month=April", "month=March" and "month=January". Similar to the controls illustrated in FIG. 4A, each of the time dimension controls illustrated in FIG. 4B includes an indication of how many media objects, in the current filtered set, satisfy the filter represented by the control. For example, control 420 indicates that 88 media objects in the current filtered set satisfy the filter "month=October".

It should also be noted that, in response to applying the "year=2013" filter, the numbers displayed in region 402 may also change. For example, in FIG. 4A, control 412 indicates that 114 media objects in the current filtered set match "country=unknown". However, after applying the filter "year=2013", control 412 in FIG. 4B indicates that only 109 media objects in the current filtered set match "country=unknown".

Second Filter Selection

For the purpose of explanation, it shall be assumed that, after selecting filter option control 414 for "year=2013", the user selects filter option control 408 associated with the filter "country=USA". Selecting filter option control 414 causes the media object navigation tool to filter the filtered set down to the 85 media objects that satisfy both the filter "year=2013" and the filter "country=USA". After filtering the filtered set, levels are once again selected, for each hierarchical dimension, based on the number of distinct values the current filtered set (now 85 media objects) has for each level of the hierarchical dimension.

In the present example, the "month" level is once again selected for the time dimension, while the "state" level is selected for the location dimension. Consequently, interface 400 transitions from the display shown in FIG. 4B to the display shown in FIG. 4C.

Figure 4C:
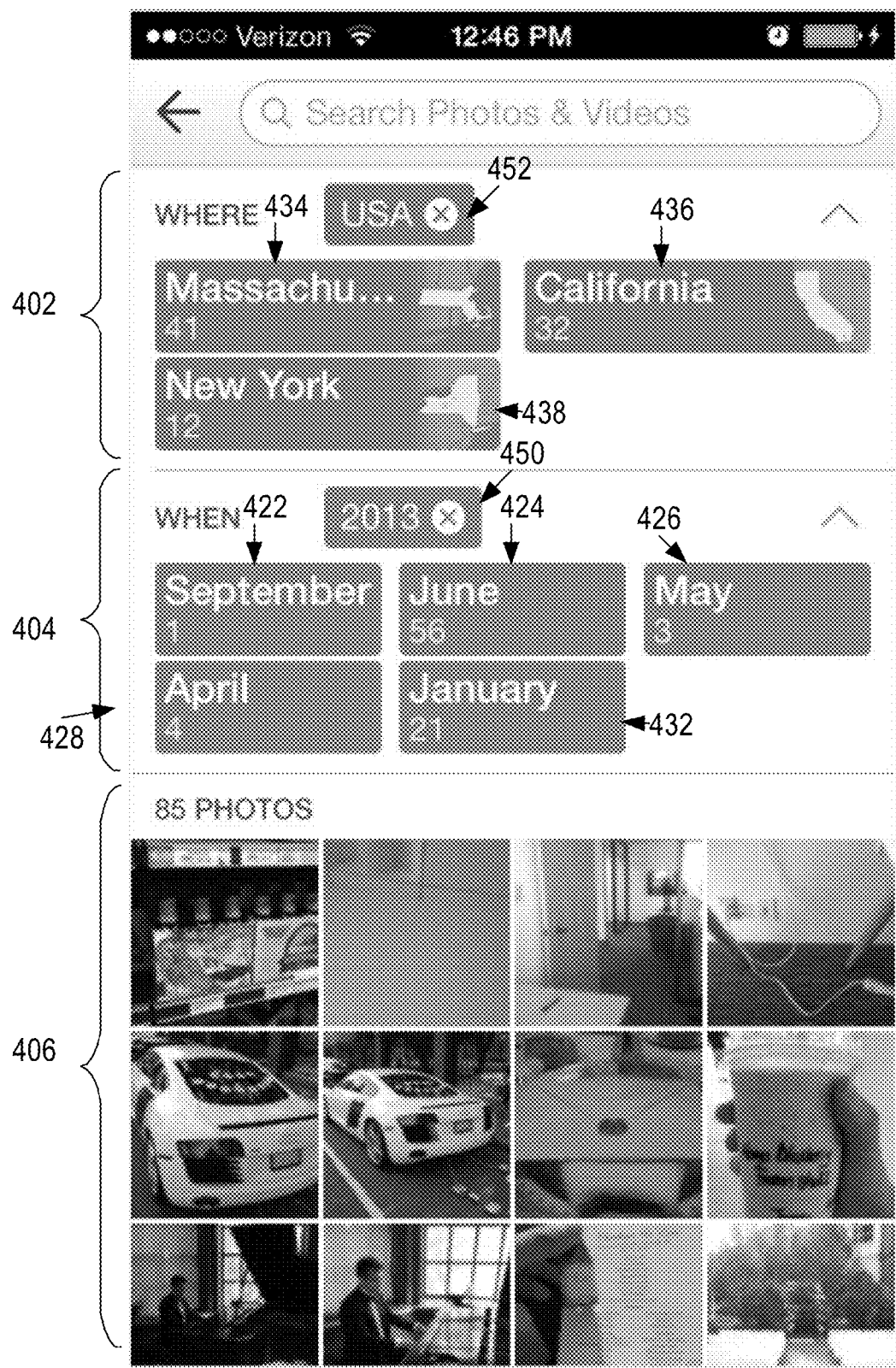

Referring to FIG. 4C, the contents of region 404 has changed, even though the "month" level of the location dimension was selected again. Specifically, region 404 now only includes the controls 422, 424, 426, 428 and 432. The controls 420 and 530, respectively for "October" and "March", are no longer displayed because no media object in the current filtered set has metadata that matches "month=October" or "month=March".

The contents of region 402 also changed because the selected display level in the location dimension is now "state". Specifically, region 402 now displays single-action filter option controls 434, 436 and 438 that correspond, respectively, to the filter options "state=Massachusetts", "state=California", and "state=New York".

Third Filter Selection

For the purpose of explanation, it shall be assumed that, after selecting filter option control 408 for "country=USA", the user selects filter option control 434 associated with the filter "state=Massachusetts". Selecting filter option control 434 causes the media object navigation tool to filter the filtered set down to the 41 media objects that satisfy the filters "year=2013", "country=USA" and "state=Massachusetts". After filtering the filtered set, levels are once again selected, for each hierarchical dimension, based on the number of distinct values the current filtered set (now 41 media objects) has for each level of the hierarchical dimension.

In the present example, the "month" level is once again selected for the time dimension, while the "city" level is selected for the location dimension. Consequently, interface 400 transitions from the display shown in FIG. 4C to the display shown in FIG. 4D.

Figure 4D:
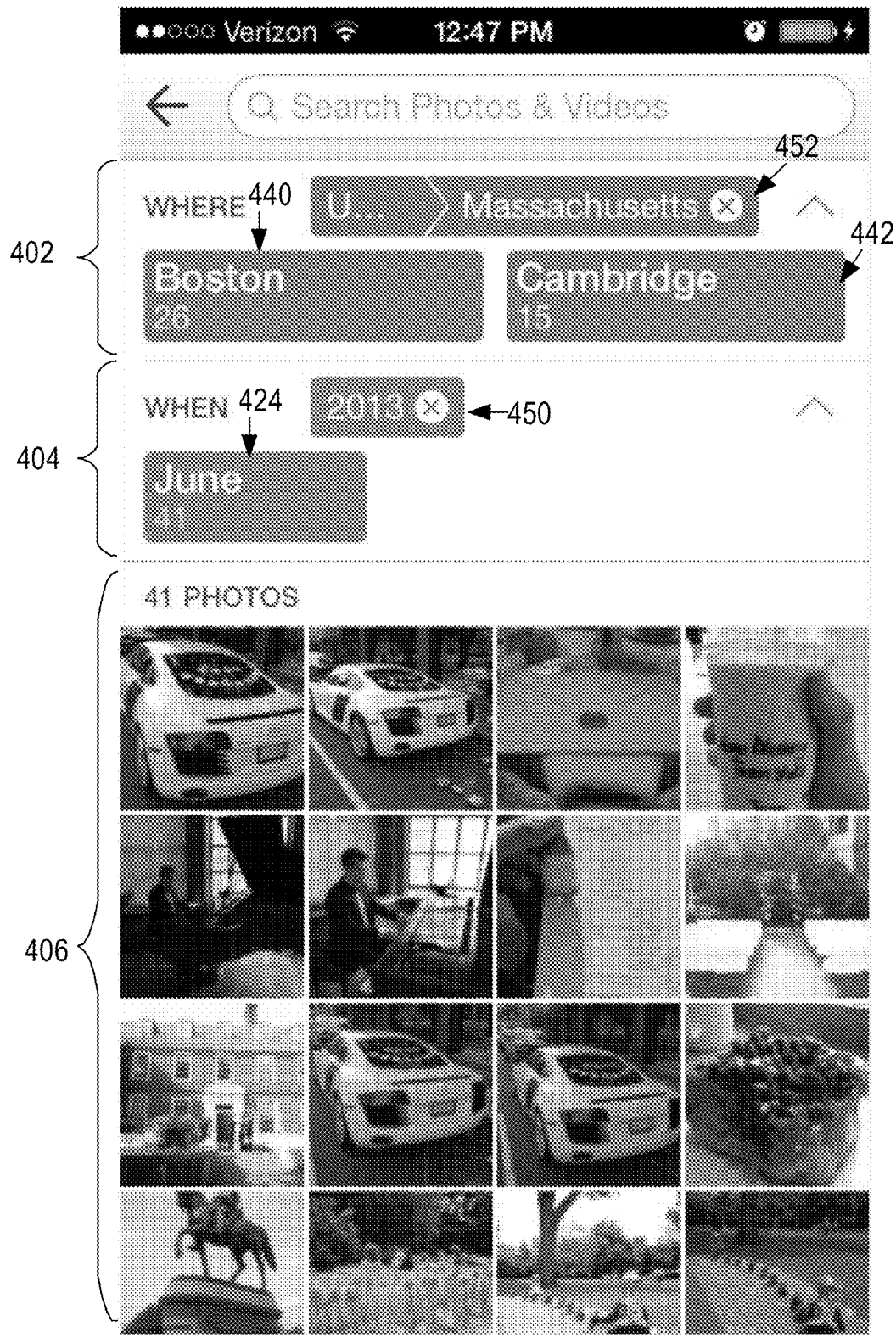

Referring to FIG. 4D, the contents of region 404 has changed, even though the "month" level of the location dimension was selected to be the display level again. Specifically, region 404 now only includes the control 424. The controls 422, 426, 428 and 432 are no longer displayed because the media objects in the current filtered set only have metadata that matches "month=June".

The contents of region 402 also changed because the selected display level in the location dimension is now "city". Specifically, region 402 now displays single-action filter option controls 440 and 442 that correspond, respectively, to the filter options "city=Boston", and "city=Cambridge".

Fourth Filter Selection

For the purpose of explanation, it shall be assumed that, after selecting filter option control filter option control 434 associated with the filter "state=Massachusetts", the user selects filter option control 440 associated with the filter "city=Boston". Selecting filter option control 440 causes the media object navigation tool to filter the filtered set down to the 26 media objects that satisfy the filters "year=2013", "country=USA", "state=Massachusetts" and "city=Boston". After filtering the filtered set, levels are once again selected, for each hierarchical dimension, based on the number of distinct values the current filtered set (now 26 media objects) has for each level of the hierarchical dimension.

In the present example, the "month" level is once again selected for the time dimension, while the no level is selected for the location dimension. Consequently, interface 400 transitions from the display shown in FIG. 4D to the display shown in FIG. 4E.

Figure 4E:
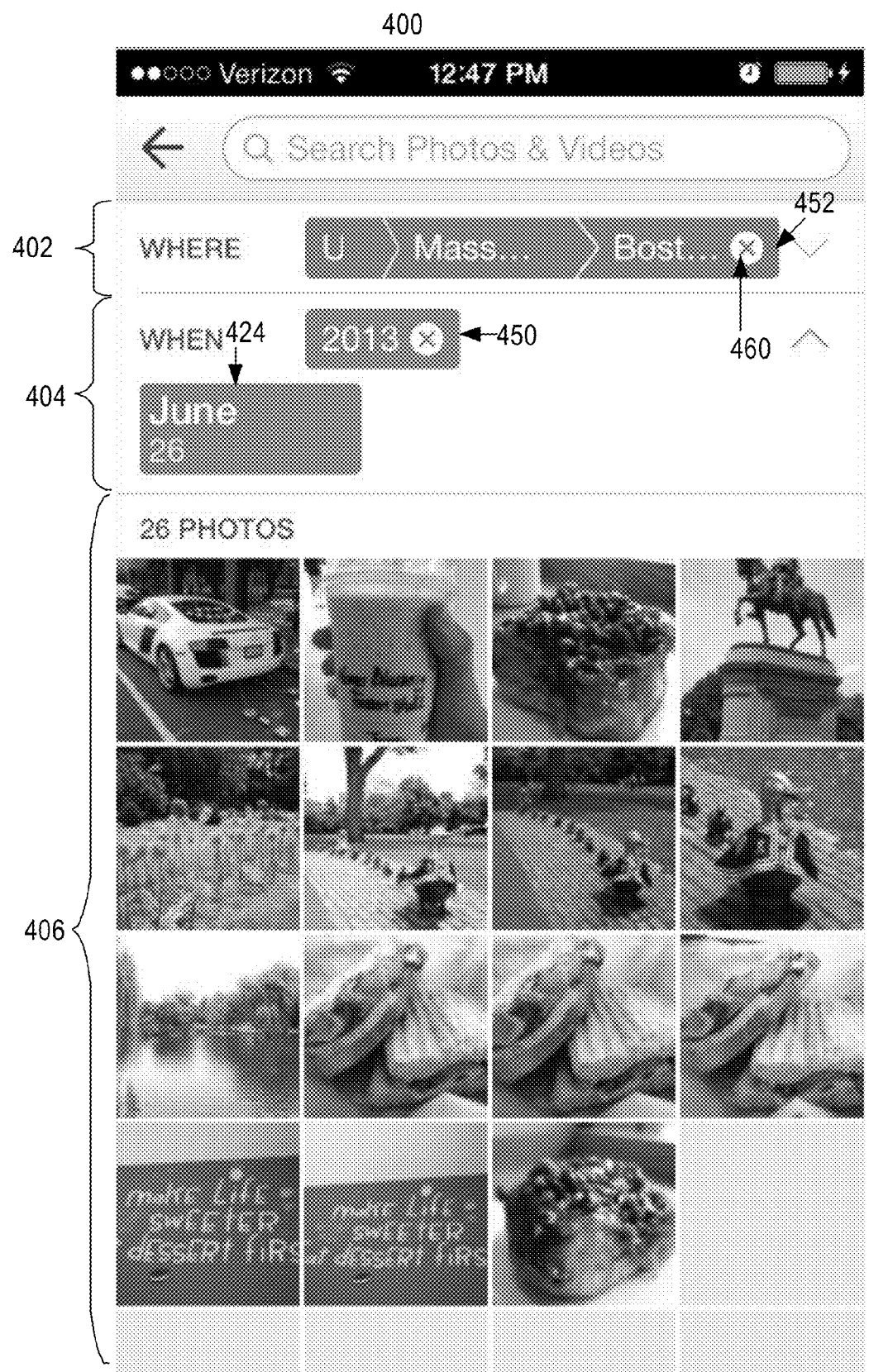

Referring to FIG. 4E, the contents of region 404 has not changed. The contents of region 402 has changed because no level was of the location dimension was selected to be the display level. The media object navigation tool may decide to select no level of a hierarchical dimension if, for example, the user has selected a filter option for the finest granularity level of the dimension (in this case, the "city" level).

Filter Indicator and Remover Control

According to one embodiment, the interface 400 generated by the media object navigation tool also include a filter indicator and remover control for each hierarchical dimension. A filter indicator and remover control for a given dimension is a control that indicates, for the given dimension, the filters that have been applied to the current filtered set for that given dimension.

For example, FIG. 4B illustrates a filter indicator and remover control 450 for the time dimension. In FIG. 4B, control 450 indicates that the filter "year=2013" has been applied to the media object collection to produce the current filtered set. In FIG. 4C, control 450 continues to indicate that the filter "year=2013" has been applied to the media object collection to produce the current filtered set. However, in addition to control 450, a filter indicator and remover control 452 for the location dimension indicates that the filter "country=USA" has also been applied to the media object collection to produce the current filter set.

In FIG. 4D, the filter indicator and remover control 452 for the location dimension has been updated to indicate that, relative to the location dimension, the media object collection has been filtered with both "country=USA" and "state=Massachusetts".

In FIG. 4E, the filter indicator and remover control 452 for the location dimension has been updated to indicate that, relative to the location dimension, the media object collection has been filtered with "country=USA", "state=Massachusetts" and "city=Boston".

In the illustrated embodiment, the filter indicators for each hierarchical dimension are displayed, within the filter indicator and remover control for the dimension, in a sequence that is based on the level of the hierarchy to which the filter corresponds. Thus, the indicator for "country=USA" is to the left of the indicator for "state=Massachusetts", which is to the left of the indicator for "city=Boston".

According to one embodiment, the filter indicator remover controls not only provide the user an indication of the filters that are being applied for each dimension, they also provide a mechanism for removing filters, thereby expanding the current filtered set. In the illustrated embodiment, a filter is removed by selecting a remove control on the indicator for the filter. For example, the filter "city=Boston" may be removed by selecting remove control 460, illustrated in FIG. 4E.

In response to selecting remove control 460, the indicator for the filter "city=Boston" would be removed from control 452, and the filter "city=Boston" would ceased to be applied to the media object collection to create the current filtered set. Because the filter "city=Boston" is no longer applied, membership of the current filter set changes. As a result, the media object navigation tool reselects the display levels for each hierarchical dimension based on the number of distinct values media objects in the new filtered set have at each level in the hierarchical dimension. In the present example, selection of remove control 460 causes interface 400 to transaction from the display shown in FIG. 4E to the display shown in FIG. 4D.

Alternatives

While various specific embodiments of a media object navigation tool have been described, the techniques described herein are not limited to the details of those specific embodiments. For example, location and time are merely two examples of hierarchical dimensions that may be used to navigate through media objects. In addition, there may be multiple instances of the same hierarchical dimension. For example, one may navigate through media objects based on the creation time of the media objects, or the last modification date of the media objects.

In addition to hierarchical dimensions, filter options may be presented for metadata fields that are not hierarchical, such as the size of the media object. Selecting such a filter will affect the membership of the current filtered set, and therefore trigger re-selection of display levels for each of the hierarchical dimensions.

In many of the embodiments described above, filter options were dynamically selected based on a rule that takes into account how many distinct values the media objects in the current filtered set have at each level of a hierarchical dimension. However, the filter options may alternatively be selected on another basis. For example, in response to a filter option being selected at one level of a hierarchical dimension, the media object navigation tool may automatically select the level of the hierarchical dimension to be the display level, regardless of how many distinct values the media objects in the new filtered set have for that level.

For example, when a country-level filter is selected, the state-level may automatically be established as the next display level for the location dimension (even if all of the media objects in the filtered set are from the same state). Similarly, when a year-level filter is selected, the month-level may automatically be established as the next display level for the time dimension (even if all of the media objects in the filtered set are from the same month).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
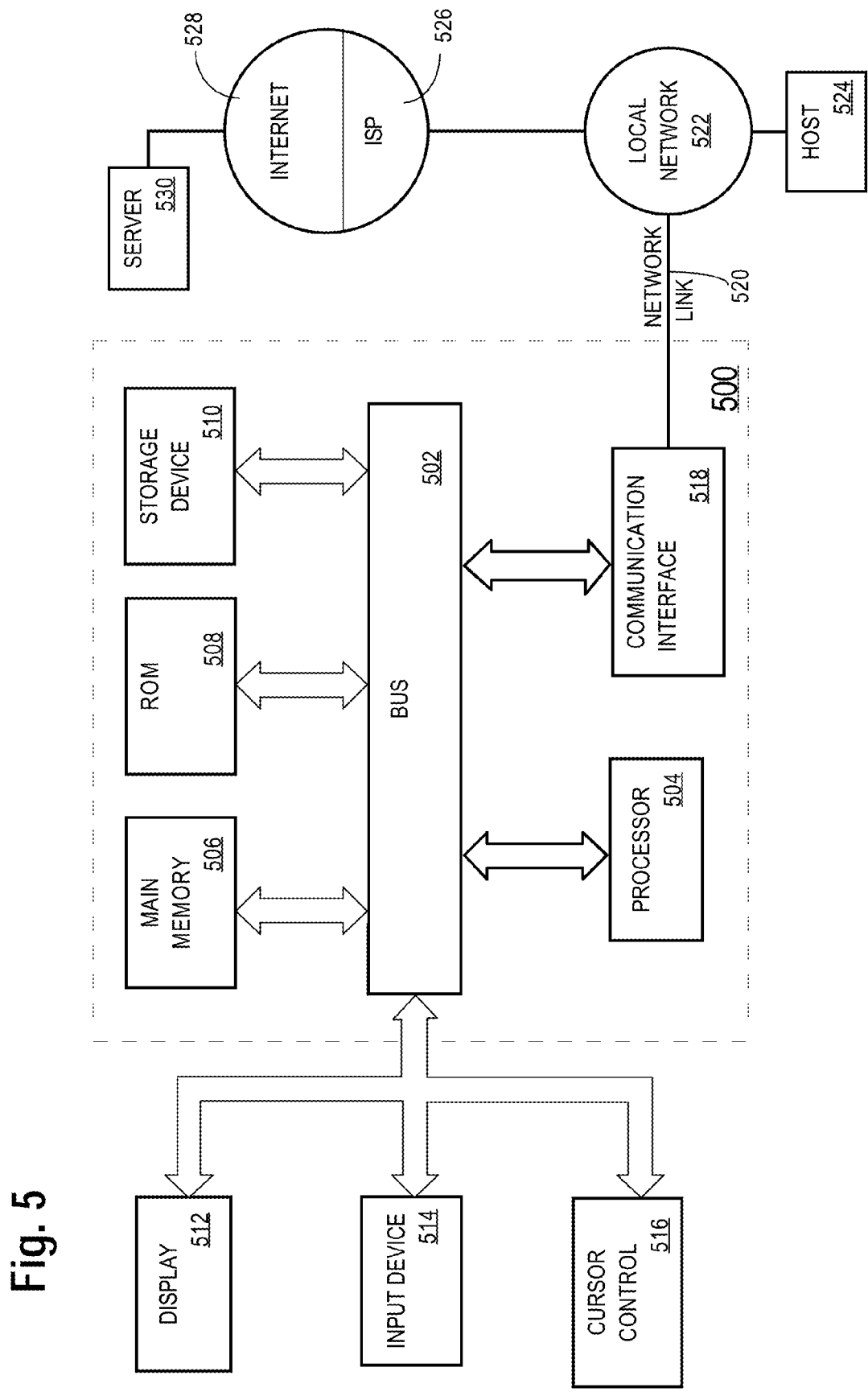
FIG. 5 is a block diagram that illustrates a computer system on which embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
concurrently displaying a first plurality of single-action controls;
wherein each single-action control of the first plurality of single-action controls corresponds to a filter option for a collection of media objects;
while displaying the first plurality of single-action controls, detecting first input that selects a first single-action control of the first plurality of single-action controls corresponding to a first dimension;
in response to detecting the first input, performing the steps of:
filtering the collection of media objects, based on the filter option associated with the first single-action control, to produce a first filtered set of media objects; and
displaying a second plurality of single-action controls;
wherein each single-action control of the second plurality of single-action controls corresponds to a filter option for the first filtered set of media objects;
while displaying the second plurality of single-action controls, detecting second input that selects a second single-action control of the second plurality of single-action controls corresponding to a second dimension;
wherein the second dimension is different than the first dimension;
in response to detecting the second input, performing the steps of:
filtering the first filtered set of media objects, based on the filter option associated with the second single-action control, to produce a second filtered set of media objects; and
displaying a third plurality of single-action controls;
wherein each single-action control of the third plurality of single-action controls corresponds to a filter option for the second filtered set of media objects;
while displaying the third plurality of single-action controls, detecting third input; and
in response to detecting the third input, producing a third filtered set of media objects;
wherein the third filtered set of media objects is the collection of media objects filtered based on the filter option associated with the second single-action control but not based on the filter option associated with the first single-action control.

2. The method of claim 1 further comprising, in response to detecting the first input, displaying a first filter remover control for removing the filter option associated with the first single-action control.

3. The method of claim 2 wherein detecting third input comprises detecting selection of the first filter remover control.

4. The method of claim 2 further comprising, in response to detecting the second input, displaying a second filter remover control for removing the filter option associated with the second single-action control.

5. The method of claim 1 wherein:
the first dimension is time; and
the second dimension is location.

6. The method of claim 1 wherein:
filtering the collection of media objects, based on the filter option associated with the first single-action control, to produce a first filtered set of media objects comprises filtering the collection of media objects to produce a filtered set of media objects that were created in a particular year; and
displaying a second plurality of single-action controls comprises displaying a single-action control for each month, in the particular year, in which at least one media object in the filtered set of media objects was created.

7. The method of claim 6 wherein the third filtered set of media objects is the collection of media objects filtered based on the filter option associated with second single-action control but not limited to media object created in the particular year.

8. The method of claim 7 wherein the filter option associated with the second single-action control filters out all media objects that were not created in a particular geographic area.

9. A method comprising:
based on a distribution of metadata values corresponding to media objects that belong to a collection of media objects, determining a first set of filter options;
concurrently displaying a first plurality of single-action controls corresponding to the first set of filter options, each single-action control of the first plurality of single-action controls corresponding to a filter option of the first set of filter options; and
in response to selection of a first single-action control of the first plurality of single-action controls:

filtering the collection of media objects, based on the filter option associated with the first single-action control, to produce a first filtered set of media objects;

based on a distribution of metadata values corresponding to the first filtered set of media objects, determining a second set of filter options;

concurrently displaying a second plurality of single-action controls corresponding to the second set of filter options, each single-action control of the second plurality of single-action controls corresponding to a filter option of the second set of filter options; and in response to selection of a second single-action control of the second plurality of single-action controls, filtering the first filtered set of media objects, based on the filter option associated with the second single-action control, to produce a second filtered set of media objects, wherein the first plurality of single-action controls includes time-dimension controls and location-dimension controls;

wherein the first single-action control is a time-dimension control;

wherein selection of the first single-action control causes changes to both which time-dimension controls are displayed and which location-dimension controls are displayed; and wherein the method is performed by a mobile device.

10. A non-transitory computer-readable medium storing instructions which, when executed by one or more computing devices, cause:

concurrently displaying a first plurality of single-action controls;

wherein each single-action control of the first plurality of single-action controls corresponds to a filter option for a collection of media objects;

while displaying the first plurality of single-action controls, detecting first input that selects a first single-action control of the first plurality of single-action controls corresponding to a first dimension;

in response to detecting the first input, performing the steps of:

filtering the collection of media objects, based on the filter option associated with the first single-action control, to produce a first filtered set of media objects; and displaying a second plurality of single-action controls;

wherein each single-action control of the second plurality of single-action controls corresponds to a filter option for the first filtered set of media objects;

while displaying the second plurality of single-action controls, detecting second input that selects a second single-action control of the second plurality of single-action controls corresponding to a second dimension;

wherein the second dimension is different than the first dimension;

in response to detecting the second input, performing the steps of:

filtering the first filtered set of media objects, based on the filter option associated with the second single-action control, to produce a second filtered set of media objects; and displaying a third plurality of single-action controls;

wherein each single-action control of the third plurality of single-action controls corresponds to a filter option for the second filtered set of media objects;

while displaying the third plurality of single-action controls, detecting third input; and in response to detecting the third input, producing a third filtered set of media objects;

wherein the third filtered set of media objects is the collection of media objects filtered based on the filter option associated with the second single-action control but not based on the filter option associated with the first single-action control.

11. The non-transitory computer-readable medium of claim 10 further storing instructions which cause, in response to detecting the first input, displaying a first filter remover control for removing the filter option associated with the first single-action control.

12. The non-transitory computer-readable medium of claim 11 wherein detecting third input comprises detecting selection of the first filter remover control.

13. The non-transitory computer-readable medium of claim 11 further storing instructions which cause, in response to detecting the second input, displaying a second filter remover control for removing the filter option associated with the second single-action control.

14. The non-transitory computer-readable medium of claim 10 wherein:

the first dimension is time; and the second dimension is location.

15. The non-transitory computer-readable medium of claim 10 wherein:

filtering the collection of media objects, based on the filter option associated with the first single-action control, to produce a first filtered set of media objects comprises filtering the collection of media objects to produce a filtered set of media objects that were created in a particular year; and displaying a second plurality of single-action controls comprises displaying a single-action control for each month, in the particular year, in which at least one media object in the filtered set of media objects was created.

16. The non-transitory computer-readable medium of claim 15 wherein the third filtered set of media objects is the collection of media objects filtered based on the filter option associated with second single-action control but not limited to media object created in the particular year.

17. The non-transitory computer-readable medium of claim 16 wherein the filter option associated with the second single-action control filters out all media objects that were not created in a particular geographic area.

18. A non-transitory computer-readable medium storing instructions which, when executed, cause:

based on a distribution of metadata values corresponding to media objects that belong to a collection of media objects, determining a first set of filter options;

concurrently displaying a first plurality of single-action controls corresponding to the first set of filter options, each single-action control of the first plurality of single-action controls corresponding to a filter option of the first set of filter options; and in response to selection of a first single-action control of the first plurality of single-action controls:

filtering the collection of media objects, based on the filter option associated with the first single-action control, to produce a first filtered set of media objects;

based on a distribution of metadata values corresponding to the first filtered set of media objects, determining a second set of filter options;

concurrently displaying a second plurality of single-action controls corresponding to the second set of filter options, each single-action control of the second plurality of single-action controls corresponding to a filter option of the second set of filter options; and in response to selection of a second single-action control of the second plurality of single-action controls, filtering the first filtered set of media objects, based on the filter option associated with the second single-action control, to produce a second filtered set of media objects;

wherein the first plurality of single-action controls includes time-dimension controls and location-dimension controls;

wherein the first single-action control is a time-dimension control; and wherein selection of the first single-action control causes changes to both which time-dimension controls are displayed and which location-dimension controls are displayed, wherein the non-transitory computer-readable medium is performed by a mobile device.

* * * * *